(12) United States Patent
Hong

(10) Patent No.: US 6,819,541 B2
(45) Date of Patent: Nov. 16, 2004

(54) CAPACITOR FOR MAGNETRON OF A MICROWAVE OVEN

(75) Inventor: Won-Pyo Hong, Bucheon-si (KR)

(73) Assignee: Daewoo Electronics Corp., Seoul (KR)

( * ) Notice: Subject to any disclaimer, the term of this patent is extended or adjusted under 35 U.S.C. 154(b) by 0 days.

(21) Appl. No.: 10/339,728

(22) Filed: Jan. 10, 2003

(65) Prior Publication Data

US 2003/0147195 A1 Aug. 7, 2003

(30) Foreign Application Priority Data

Feb. 6, 2002 (KR) .................................. 2002-6762
Feb. 28, 2002 (KR) ................................. 2002-10741

(51) Int. Cl.⁷ ................................................ H01G 4/35
(52) U.S. Cl. ...................... 361/302; 361/303; 361/329; 361/306.1
(58) Field of Search ................................ 361/302–303, 361/329–330, 328, 306.1, 306.2

(56) References Cited

U.S. PATENT DOCUMENTS 4,370,698 A * 1/1983 Sasaki ........................ 361/330
4,811,161 A * 3/1989 Sasaki et al. ............... 361/302
5,142,436 A * 8/1992 Lee et al. .................... 361/302

OTHER PUBLICATIONS

EPO Examination Report in a counterpart European application.

\* cited by examiner

Primary Examiner—Anthony Dinkins
(74) Attorney, Agent, or Firm—Jones Day

(57) ABSTRACT

Disclosed is a capacitor for effectively shielding noise generated from a magnetron. According to an embodiment of the present invention, a case of the capacitor is combined with a ground plate in order that electrode insulation pipes integrally formed in the case extend through extending pipes mounted in the ground plate. Electrodes respectively extend through the electrode insulation pipes. A fixing cover is inserted through an upper opening of the case into the case to be disposed over the electrode insulation pipes, of which a fixing pipe extends through the case so as to come in contact with a screwed hole formed in the ground plate. The extending pipes respectively prevent unnecessary microwave noise generated from the magnetron. A length of the extending pipe is preferably in a range of 5 to 15 mm. Furthermore, the extending pipe and the electrode are made such that a sum of radiuses of the extending pipe and the electrode is less than 5 mm.

21 Claims, 13 Drawing Sheets

CAPACITOR FOR MAGNETRON OF A MICROWAVE OVEN

FIELD OF THE INVENTION

The present invention relates to a capacitor for a magnetron of a microwave oven, and more particularly to a capacitor for a magnetron of a microwave oven capable of effectively shielding noise generated from the magnetron of the microwave oven.

PRIOR ARTS

Generally, various apparatuses such as home microwave oven, commercial thawing machine, industrial dryer and the like using microwave include a magnetron for generating the microwave and a capacitor for shielding noises.

The magnetron for generating the microwave is provided in an electric field space of the microwave oven. Such microwave is generated when a high voltage conducted by first and second conductive coils of a high voltage transformer attached on a substrate in the electromagnetic field space is stably supplied to the magnetron. The high voltage is generated by a conducting action of the conduction coils. Such microwave is emitted through an irradiating tube in a cooking chamber.

After passing through the irradiating tube, the microwave is emitted in the cooking chamber to heat and to cook foods placed in the cooking chamber.

The electric power line of the magnetron is mainly comprised of filament, cathode and anode. When the high voltage is applied to the magnetron to generate the microwave, the microwave having a basic frequency suitable for heating the foods as well as an unnecessarily emitted microwave, i.e. noise are generated. Then, the noise flows backward through the filament and the cathode to conduct the wave interruption to adjacent appliances.

Especially, as a television broadcasting using a satellite is widely used, the unnecessary microwave of the magnetron interacts with the broadcasting frequency so as to make an obstruction to the television receiver.

A chock coil and a capacitor connected thereto are provided to the cathode in order to reduce the reverse effect on the adjacent appliance by the noises of the magnetron. The cathode supplies electricity to the filament. The choke coil having a conductive resistance and the capacitor connected thereto absorb the unnecessary microwave, thereby preventing a leakage of the unnecessary microwave.

The choke coil is enclosed within the insulation case which is provided under the magnetron, while the capacitor is mounted outside of the insulation case. One end of the choke coil is connected to the power supply line of the filament, of which the other end is connected to a lead line of the capacitor.

A through type capacitor is widely used, which is disclosed in U.S. Pat. No. 4,811,161 (issued to Sasaki, et al on Mar. 7, 1989). In a magnetron using the through type capacitor, the choke coil is in series connected between the cathode of the magnetron and a through conduction of the through type capacitor, and the through type capacitor is inserted in a sidewall of an insulating case.

FIG. 1 is an exploded perspective view of a noise insulation apparatus including a through type capacitor according to the conventional art, and FIG. 2 is a sectional view of the through type capacitor shown in FIG. 1.

As shown in FIGS. 1 and 2, the conventional through type capacitor 10 includes an ellipse ceramic dielectric 20. The ceramic dielectric 20 has a pair of parallel thru-holes 22a and 22b. A spaced pair of electrodes 24a and 24b is provided on an upper surface of the ceramic dielectric 20 while a common electrode 26 is provided on a lower surface of the dielectric 20. The spaced electrodes 24a and 24b, and the common electrodes 26 respectively comprise thru-hole corresponding to the thru-holes 22a and 22b of the ceramic dielectric 20. The capacitor 10 further includes a grounding fitment 30 of metal material of which an ellipse opening 32 is formed at the center portion. An upstanding is formed at a desired height along a periphery of the opening on the grounding figment 30. The ceramic dielectric 30 is fixed via the common electrode 26 on the upstanding of the grounding fitment 30 in a suitable manner of soldering and the like.

Furthermore, the capacitor 10 includes a pair of conductor coated with insulation tubes 36a and 36b. The insulation tubes 36a and 36b are made of a proper material such as silicon and the like. The insulation tubes 36a and 36b are respectively inserted into the respective thru-holes 22a and 22b. The opening 32 and the through conductor 38a and 38b are respectively fitted to the respective electrode connectors 40a and 40b by press. The respective electrode connector 40a and 40b are fixed to the spaced electrodes 24a and 24b in a proper manner of soldering and the like. The through conductors 38a and 38b may be fixed to the electrode connectors 40a and 40b by the soldering and the like.

The grounding fitment 30 is formed by pressing a metal plate so that the upstanding 34 is projected to enclose the opening 32 and so that a surface of the grounding fitment 30 has a recess 42 to form an inner surface of the upstanding 34. Four thru-holes 31 are formed at four corners of the grounding fitment 30, through which the grounding fitment 30 can be attached to the shielding case 50.

The capacitor 10 further includes an insulation case 52 enclosing the ceramic dielectric 20 and an insulation cylinder 54 enclosing the thru-conductor 38a and 38b. A lower portion of the insulation case 52 is fixed to the upstanding 34 of the grounding fitment 30 while an upper portion of the insulation cylinder 54 is fixed into the recess 42 of the grounding fitment 30. The insulation case 52 and the insulation cylinder 54 are filled with insulation materials 60 and 62 such as epoxy resin and the like so that the ceramic dielectric 20 is covered with the resin or in which the resin is filled in order to be waterproof and to secure insulation property of the ceramic dielectric 20. The reference numeral 64 denotes a surface of the insulation resin in FIG. 2. The insulation case 52 and the insulation cylinder 54 are made of thermoplastic resin such as polybutylene terepthalate (PBT).

The respective through conductors 38a and 38b have respective fixing tabs 39a and 39b integrally formed at an end thereof, which are received in the insulation case 52 to apply high voltage. Since one end of the fixing tabs 39a and 39b is projected through one end of the insulation case 52, the fixing tabs 39a and 39b are easily connected to an outer terminal.

When the grounding fitment 30 is fixedly pressed to the shielding case 50, a large opening 56 corresponding to the capacitor 10 and four bearing holes 58 corresponding to four thru-holes 31 of the grounding fitment 30 are formed in the shielding case 50. Then, the bearing holes 58 face the thru-holes 31 so that the grounding fitment 30 is assembled by means of bolts with the shielding case 50.

The thru type capacitor 10 connecting the choke coil of the shielding case 50 to the outer terminal prevents the noises from being conducted through the lead line, which shields the radiated noises.

As described above, however, since the apparatus for shielding the noises from the magnetron according to the conventional art includes a plurality of assembling parts, the structure of the apparatus is complicated so that the cost of material increases as well as the assembling process becomes very difficult to reduce productivity. Furthermore, after assembling, some microwaves leak through the inserting hole of the shielding case, the thru-holes of the grounding fitment and the bearing holes of the shielding case, failing to prevent the noises to the utmost.

SUMMARY OF THE INVENTION

Therefore, the present invention has been developed to solve the above-mentioned problems.

It is an object of the present invention to provide a capacitor of a magnetron for a microwave oven capable of shielding noise such as unnecessary microwave generated from the magnetron, which has a simple structure to reduce manufacturing costs, resulting in improving productivity.

In order to accomplish the objects of the present invention, there is provided a capacitor of a magnetron for a microwave oven according to the present invention, which comprises: an insulation case; a ground plate which is combined with the insulation case, for absorbing and shielding noises such as unnecessary microwaves generated from the magnetron; and a pair of electrodes which has a fixing tap and which extends through the insulation case and the ground plate, for supplying electric current to the magnetron.

According to the first embodiment of the present invention, the insulation case is integrally formed with a pair of electrode insulating pipes. An upright portion is formed on a surface of the ground plate, in which through-holes are formed in order that the electrode insulating pipes respectively extend through the through-holes. Flanges are respectively formed around the through-holes of the ground plate.

According to the second embodiment of the present invention, the insulation case includes an upper insulation case and a lower insulation case. The upper insulation case is inserted on the upright portion of the ground plate at an upper surface of the ground plate, and the lower insulation case is inserted in a groove defined by the upright portion at a lower surface of the ground plate.

A pair of electrode insulating pipes respectively extends through the pair of extension pipes, the upper insulation case and the lower insulation case, through which the pair of electrodes respectively extends.

A space defined by the upper insulation case and the ground plate and a space defined by the lower insulation case and the ground plate are filled with insulation resin.

According to the third embodiment of the present invention, the insulation case is integrally formed with a pair of electrode insulating pipes. An upright portion is formed on a surface of the ground plate, in which a pair of through-holes is formed.

Extension pipes having a desired length are respectively mounted in the through-holes of the ground plate to extend into the insulation case, through which the electrode insulating pipes respectively extend.

According to the fourth embodiment of the present invention, the insulation case is integrally formed with a pair of electrode insulating pipes. A pair of through-holes is formed in the ground plate, in which extension pipes are respectively mounted to extend downwardly. The electrode insulating pipes respectively extend through the extension pipes.

In the second, third and fourth embodiments of the present invention, the extension pipes mounted in the ground plate are made such that a length thereof is in a range of 5 to 15 mm, and a sum of radiuses of the electrode and the extension pipe is less than 5 mm.

Meanwhile, an insulating resin is filled, or electric wave absorbing material is disposed between the insulation case and the ground plate to shield against leakage of microwave noise.

In the capacitor according to the embodiments of the present invention constructed as described above, the ground plate formed with flanges or the ground plate combined with the extension pipes can shield the microwave noise generated from the magnetron, thereby reducing electric wave obstruction applied by the noise to home appliances near the microwave oven.

Furthermore, since a part such as a ceramic dielectric adopted to the conventional capacitor is not used in the capacitor according to the present invention, it is possible to simplify the structure of the capacitor and to reduce the cost of manufacturing the capacitor. In addition, there is an advantage in that since the structure of the capacitor is simplified, a rate of assembling the capacitor is improved to increase the productivity.

BRIEF DESCRIPTION OF THE DRAWINGS

Other features and advantages of the present invention will become more apparent from the following description taken in connection with the accompanying drawings, wherein.

DESCRIPTION OF THE PREFERRED EMBODIMENTS

Hereinafter, a capacitor for a magnetron of a microwave oven according to the preferred embodiments of the present invention will be described in detail with reference to the accompanying drawings.

Figure 1:
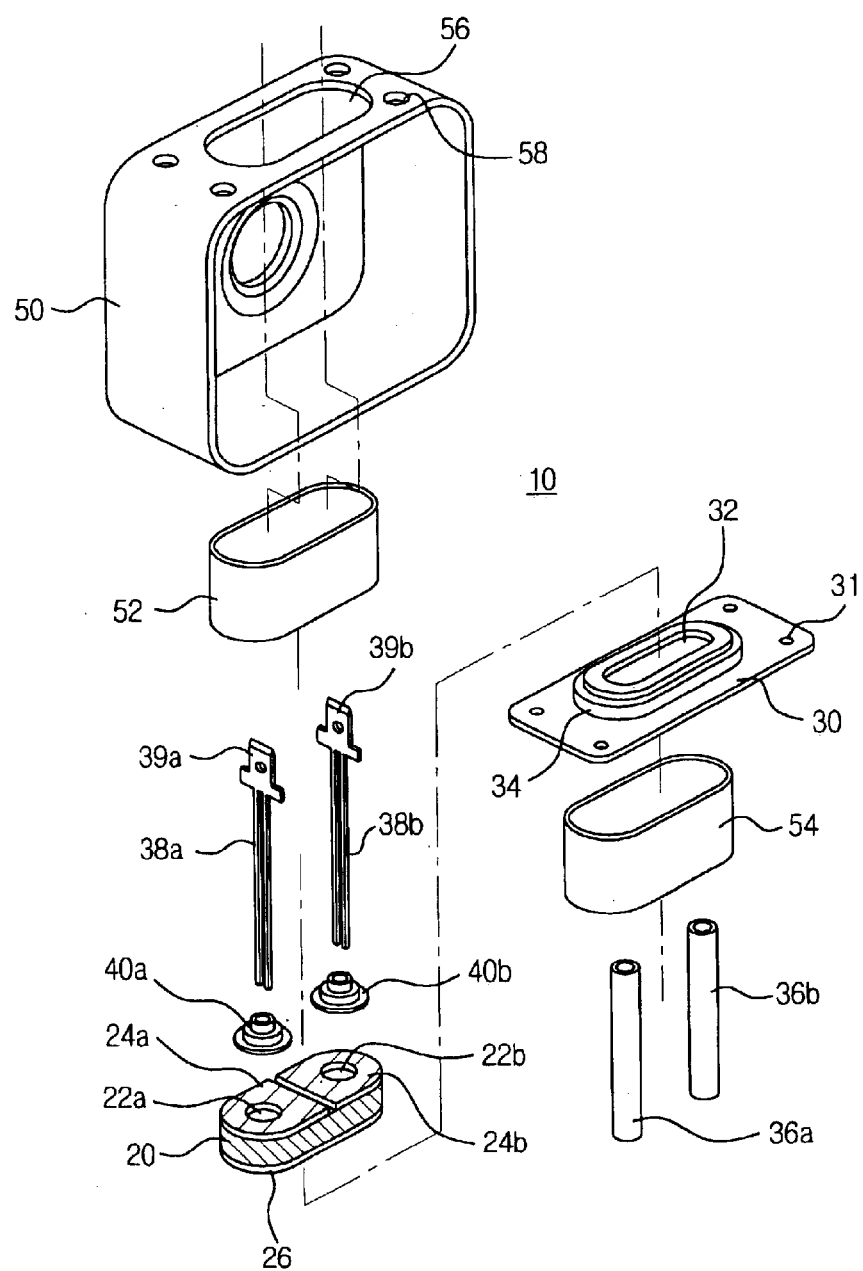
FIG. 1 is an exploded perspective view of an apparatus for shielding noise which includes a through type capacitor according to the conventional art.
Figure 2:
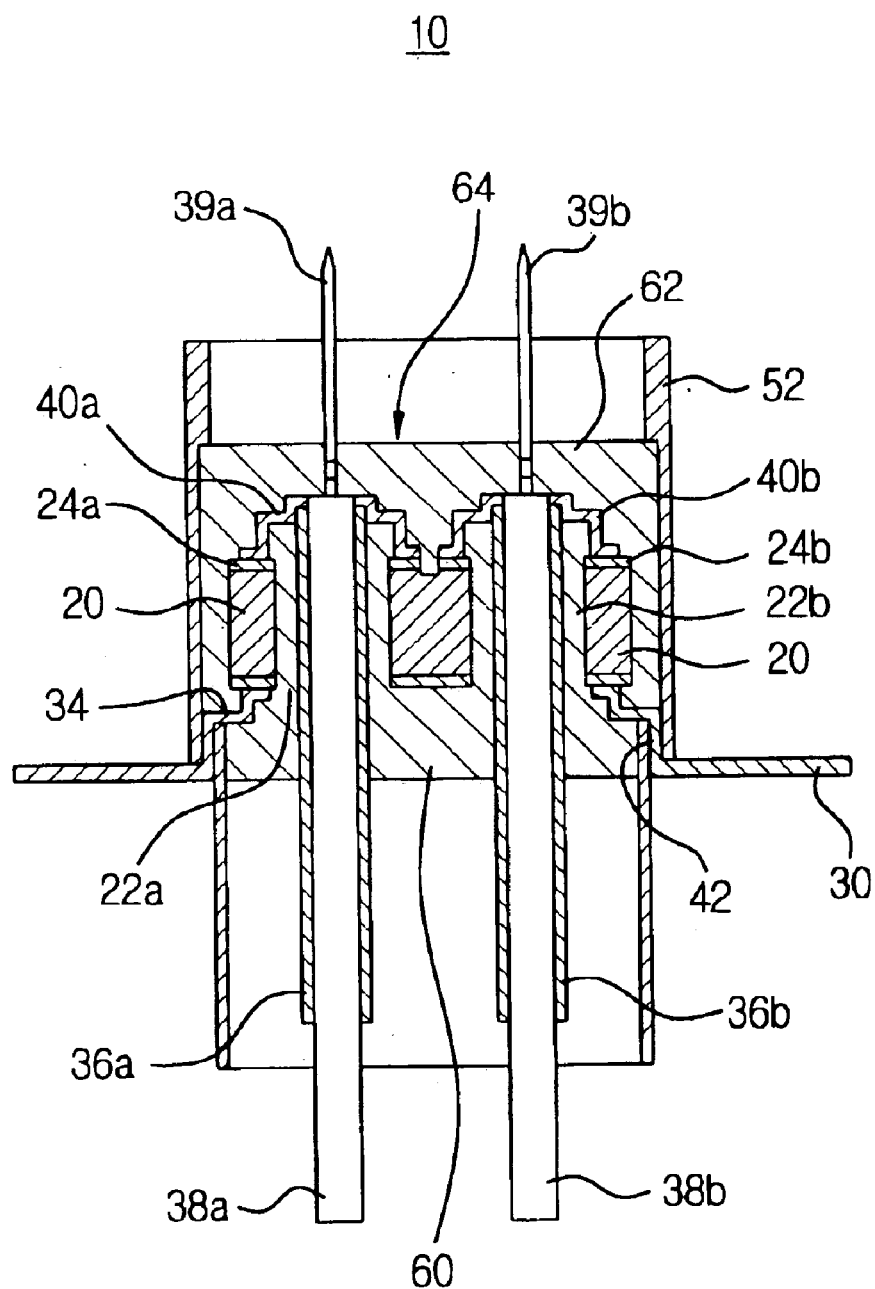
FIG. 2 is a sectional view of the through type capacitor shown in FIG. 1.
Figure 3:
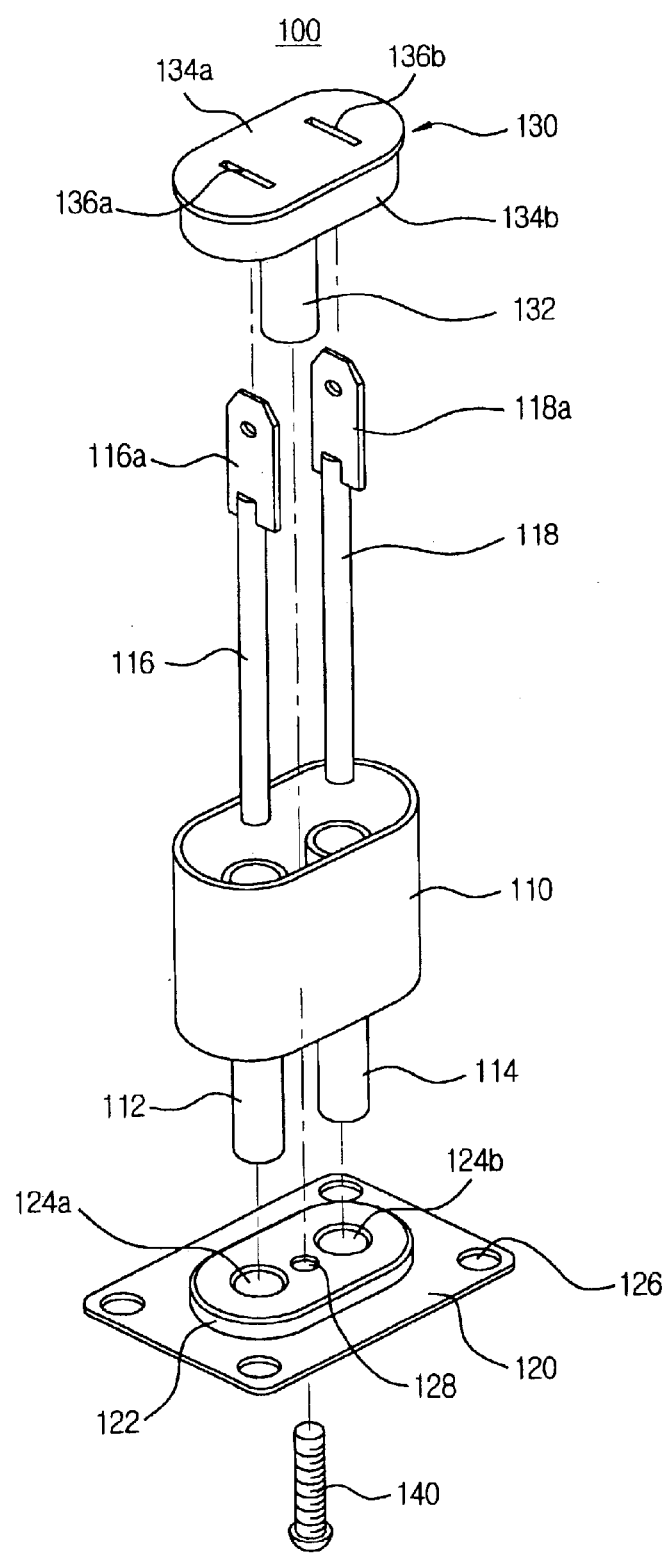
FIG. 3 is an exploded perspective view of a capacitor according to a first embodiment of the present invention.
Figure 4:
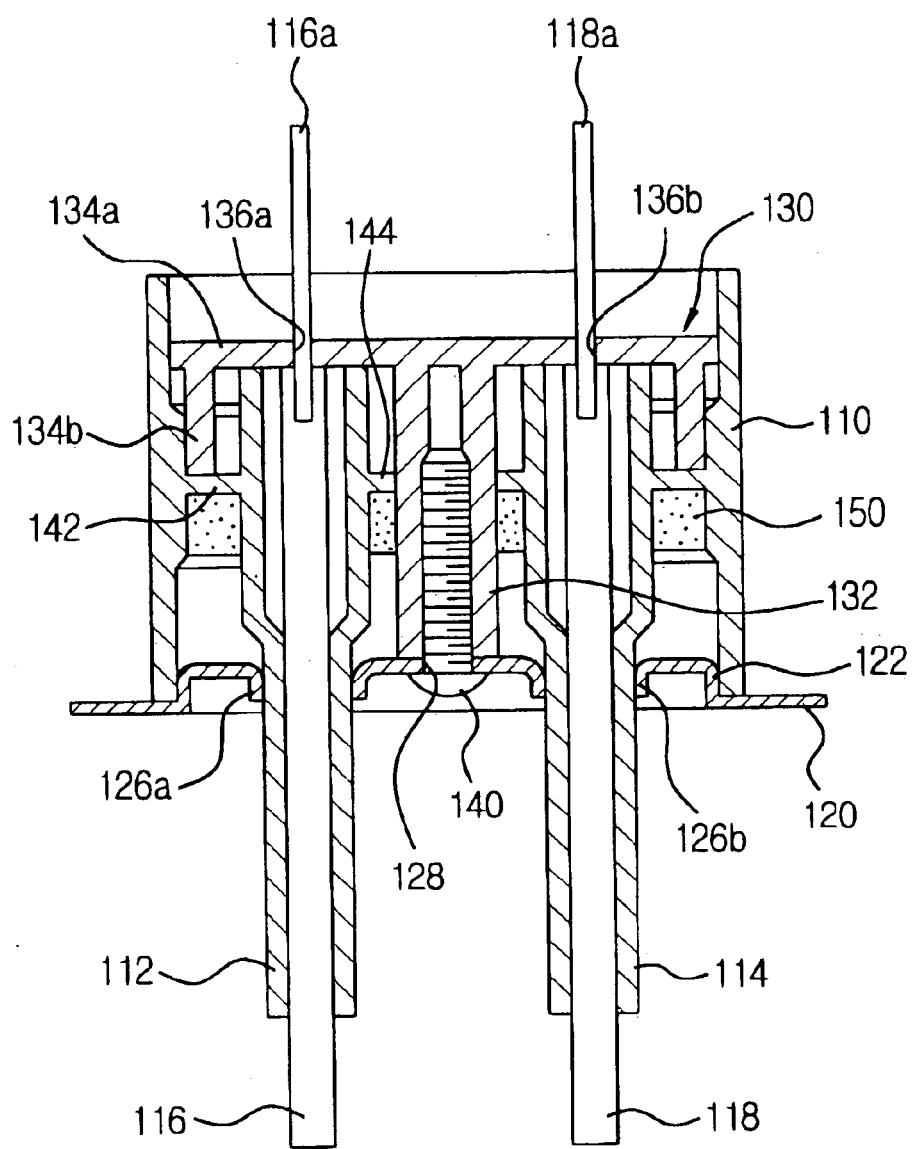
FIG. 4 is a sectional view of the capacitor shown in FIG. 3.

FIG. 3 is an exploded perspective view of a capacitor 100 for a magnetron of a microwave oven according to a first embodiment of the present invention, and FIG. 4 is a sectional view of the capacitor 100 shown in FIG. 3.

As shown in FIGS. 3 and 4, the capacitor 100 according to the first embodiment of the present invention includes an insulation case 110 having a pair of electrode insulating pipes 112 and 114 integrally formed therewith, a ground plate 120 for shielding microwave noise generated from the magnetron (not shown), which is combined at a lower portion of the insulation case 110 with the insulation case 110 so that the electrode insulating pipes 112 and 114 extend through the ground plate, a pair of electrodes 116 and 118 for supplying electric current to the magnetron, which extends through the electrode insulating pipes 112 and 114 of the insulation case 110, and a cover 130 for fixing the electrodes 116 and 118 to the insulation case 110, which is inserted through an upper opening of the insulation case 110 into the insulation case 110.

Referring to FIGS. 3 and 4, the ground plate 120 is made of conductive material, of which a surface is projected at a desired height by a press. The ground plate 120 generally has a rectangular shape, of which an upright portion 122 has an ellipse shape. A pair of through-holes 124a and 124b is formed at a desired distance from each other in the upright portion of the ground plate 120 so that the electrode insulating pipes 112 and 114 respectively extend through the through-holes 124a and 124b. Flange portions 126a and 126b are formed at the upright portion 122 in such a manner of bending and downwardly extending a plate around the through-holes 124a and 124b at a desired length.

Four thru-holes 126 are respectively formed at four corners of the ground plate 120, through which the capacitor 100 can be fixed to a shield case (not shown). Furthermore, a screwed hole 128 is formed between the through-holes 124a and 124b in the upright portion 122 of the ground plate 120 in order to insert a screw 140 when the cover 130 is combined with the insulation case 110 by the screw 140.

The insulation case 110 is made from thermostatic resin or thermoplastic resin having an excellent insulation property. The insulation case 110 has an ellipse shape corresponding to that of the upright portion 122 of the ground plate 120, which also has a desired height. The electrode insulating pipes 112 and 114 are respectively and integrally formed with the insulation case 110.

The electrode insulating pipes 112 and 114, which respectively have an upper end positioned in the insulation case 110 and a lower end extending out of the insulation case 110, are supported by a fixing plate 142 at an intermediate position of the insulation case 110 in order to be integrated with the insulation case 110. A through hole 144 is formed between the electrode insulating pipes 112 and 114 in the fixing plate 142, through which a connecting rod 132 of the fixing cover 130 extends. As a screwed recess in which a screw is to be screwed, is formed in the connecting rod 132 of the fixing cover 130, the fixing cover 130 can be fixed to the ground plate 120 by means of the screw when assembling the capacitor 100.

As shown in FIG. 4, meanwhile, the electrode insulating pipes 112 and 114 have a reduced diameter at a position near a lower end portion of the insulation case 110.

The electrodes 116 and 118 are a conductive and metallic rod having a predetermined diameter, which respectively have tabs 116a and 118a attached to each end thereof to apply a high voltage to the magnetron. The electrodes 116 and 118 extend through the electrode insulating pipes 112 and 114 which respectively extend through the through-holes 124a and 124b of the ground plate 120.

The fixing cover 130 includes a body portion 134a having an ellipse shape, a supporting wall 134b extending downwardly from whole edge of the body portion 134a, and a hollow connecting rod 132 which extends downwardly from a center portion of the body portion 134a and of which a distal end comes in contact with the upright portion 122 of the ground plate 120. A pair of slots 136a and 136b is side by side perforated at a desired distance from each other in the body portion 134a of the fixing cover 130, which are coaxial with the electrode insulating pipes 112 and 114 and the electrodes 116 and 118, or which are eccentric from axes of the electrodes 116 and 118 and the electrode insulating pipes 112 and 114. The tabs 116a and 118a of the electrodes 116 and 118, which respectively pass through the electrode insulating pipes 112 and 114 of the insulation case 110, respectively extend through the slots 136a and 136b.

On the other hand, an electric wave absorbing material 150 is further disposed in a lower space of the insulation case 110 to shield against leakage of the microwave noise, thereby improving an effect of shielding the noise. The electric wave absorbing material 150 also has the ellipse shape, which has a pair of through-holes through which the electrode insulating pipes 112 and 114 are extended, and which has a thru-hole through which the connecting rod 132 of the fixing cover 130 is extended. A mixture of ferromagnetic powder and organic material, rubber or insulation resin is used as the electric wave absorbing material 150 which is formed by molding the mixture.

In the capacitor 100 having the structure as described above, the electric wave absorbing material 150 is inserted in the lower space of the insulation case 110. At this time, the electric wave absorbing material 150 encloses the electrode insulating pipes 112 and 114.

Then, the lower end of the insulation case 110 is secured on the upright portion 122 of the ground plate 120 while the electrode insulating pipes 112 and 114 of the insulation case 110 extend through the through-holes 124a and 124b formed in the upright portion 122 of the ground plate 120. The electrodes 116 and 118 extend through the electrode insulating pipes 112 and 114 of the insulation case 110, while the fixing cover 130 is inserted through the upper opening of the insulation case 110 into the insulation case 110. At this time, the connecting rod 132 of the fixing cover 130 extends through the fixing plate 142 connecting the electrode insulating pipes 112 and 114 to the insulation case 110 so as to come in contact with the upright portion 122 of the ground plate 120 while facing the screwed hole 128. When the fixing cover 130 is combined with the insulation case 110, the tabs 116a and 118a of the electrodes 116 and 118 extend through the slots 136a and 136b formed in the body portion 134a of the fixing cover 130 and the insulation case 110, as shown in FIG. 4.

The capacitor 100 assembled as described above is attached through the ground plate 120 to the shield case (not shown), while the tabs 116a and 118a attached to each one end of the electrodes 116 and 118 extend out of the shield case.

The tabs 116a and 118a of the electrodes 116 and 118 are connected to an outer electric source, and the other ends of the electrodes 116 and 118 are connected to a cock coil (not shown) so that the electric current is supplied to the magnetron through -the electrodes 116 and 118, the cock coil, a cathode and an anode.

Hereinafter, an operation and effect of the capacitor 100 of the magnetron for the microwave oven according to the first embodiment of the present invention will be described with reference to the accompanying drawings.

When the microwave oven is operated in the state that food to be cooked is placed in a cooking chamber of the microwave oven, the magnetron (not shown) emits the microwave. At this time, the magnetron emits not only the microwave needed to cook the food but also unnecessary microwave noise. Such microwave noise flows back to a filament and the cathode to supply the electric current.

The microwave noise flowing back to the capacitor 100 from the magnetron is partially set off by induction resistance of the cock coil (not shown) connected to the filament (not shown) of the magnetron. The rest of the microwave noise passes through the electrodes 116 and 118 connected to the cock coil which in turn is shielded by means of the flange portions 126a and 126b of the ground plate 120 enclosing the electrodes 116 and 118.

As described above, the capacitor 100 according to the first embodiment of the present invention has a simple structure as compared to the conventional capacitor. The flange portions of the ground plate prevent the leakage of the microwave noise, while the electric wave absorbing material disposed in the lower space of the insulation case can absorb the leaked microwave noise, thereby improving an effect of shielding the leakage of the microwave noise.

Figure 5:
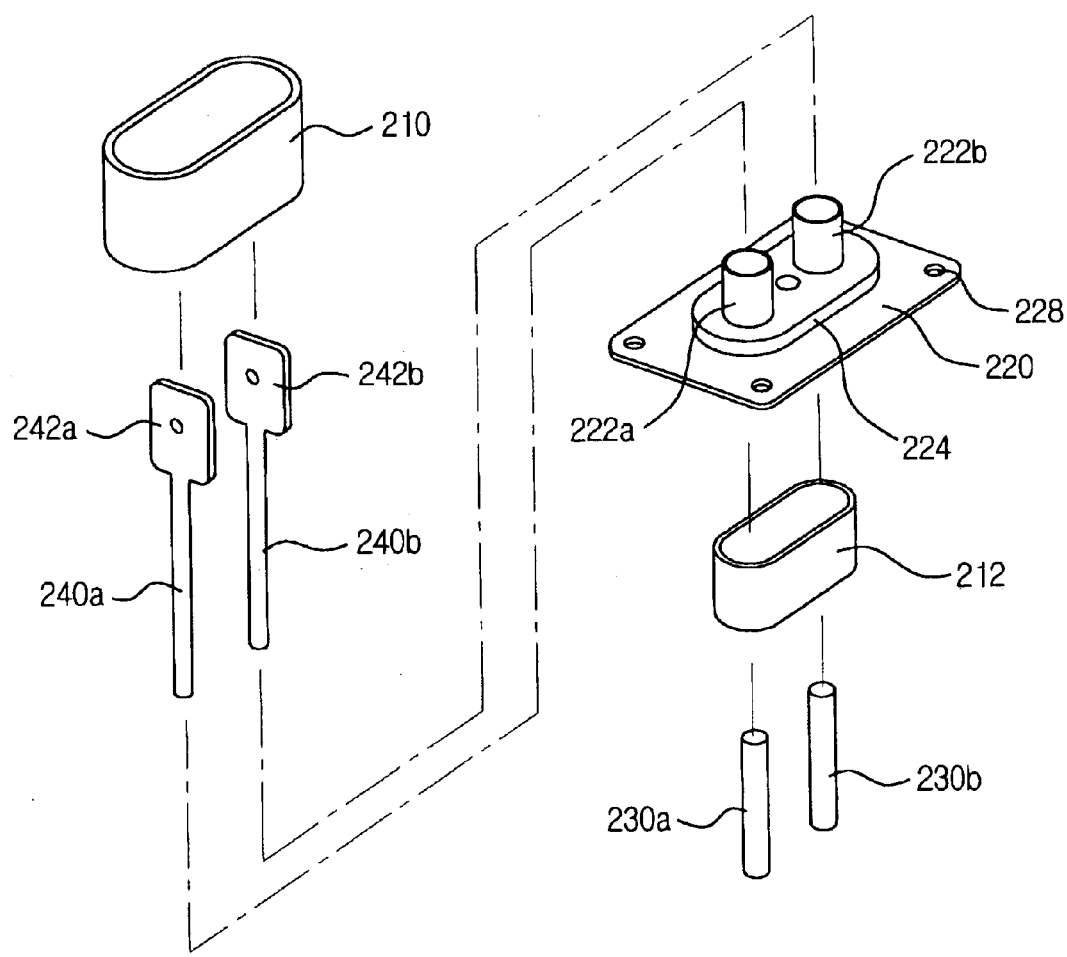
FIG. 5 is an exploded perspective view of a capacitor according to a second embodiment of the present invention.
Figure 6:
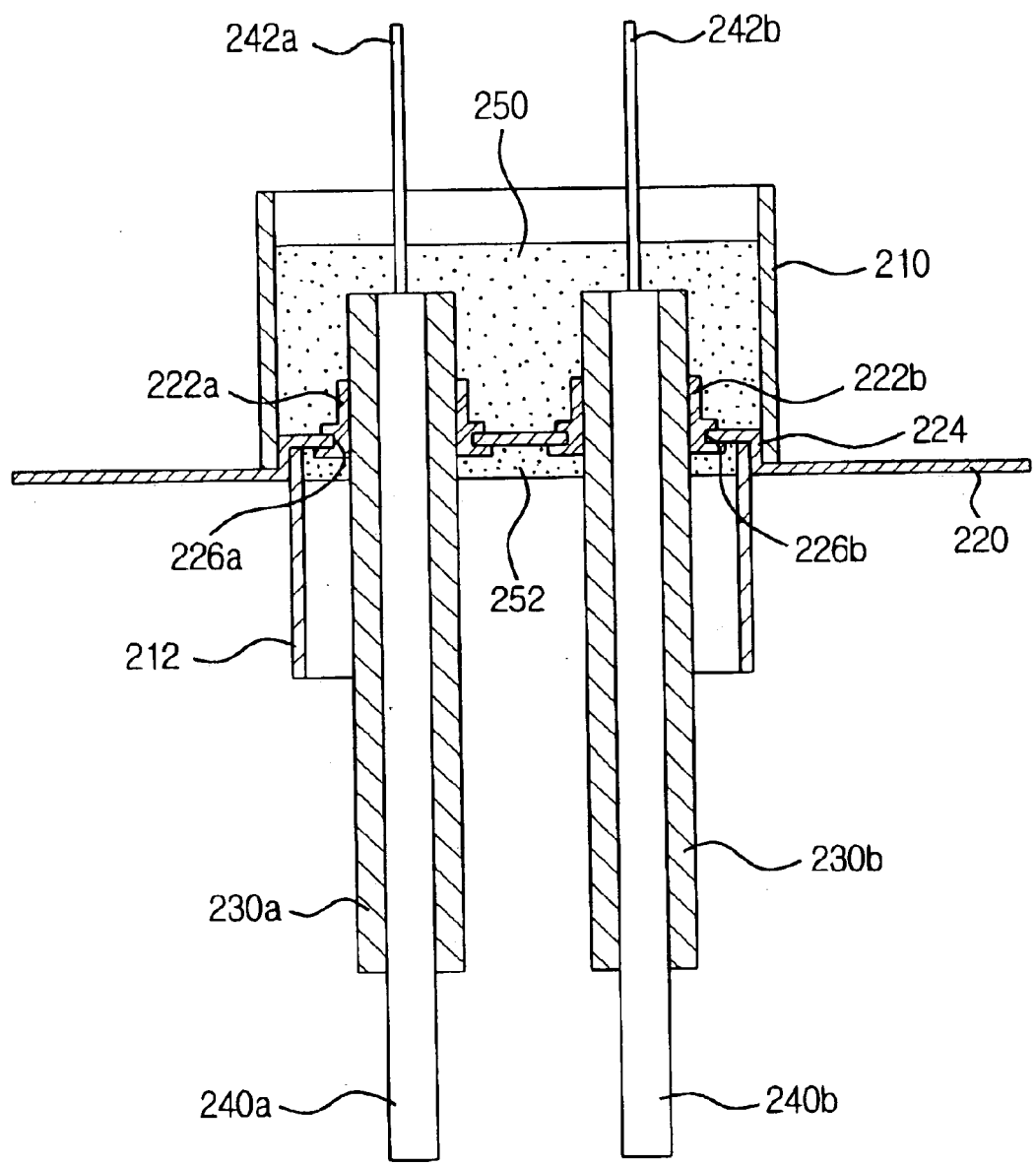
FIG. 6 is a sectional view of the capacitor shown in FIG. 5.

FIG. 5 is an exploded perspective view of a capacitor 200 of a magnetron for a microwave oven according to the second embodiment of the present invention, and FIG. 6 is a sectional view of the capacitor 200 shown in FIG. 5.

As shown in FIGS. 5 and 6, the capacitor 200 includes an upper insulation case 210, a lower insulation case 212, a ground plate 220 for shielding leaked microwave noise, which is disposed between the upper insulation case 210 and the lower insulation case 212 so as to be combined with the upper insulation case 210 and the lower insulation case 212 and which comprises a pair of extension pipes 222a and 222b, a pair of electrode insulating pipes 230a and 230b extending through the upper insulation case 210, the lower insulation case 212 and the extension pipes 222a and 222b of the ground plate 220, and a pair of electrodes 240a and 240b for supplying electric current to a magnetron, which respectively extends through the pair of the electrode insulating pipes 230a and 230b.

The ground plate 220 is made from conductive metal, of which a surface is upwardly projected at a desired height by a press. The ground plate 220 generally has a rectangular shape, of which an upright portion 224 has an ellipse shape. A pair of through-holes 226a and 226b is formed at a predetermined distance from each other in the upright portion 224 of the ground plate 220 in order to fixedly combine the extension pipes 222a and 222b with the ground plate 220.

Four thru-holes 228 are respectively formed at four corners of the ground plate 220, through which the capacitor 200 can be fixed to a shield case (not shown).

The upper insulation case 210 is made of thermostatic resin or thermoplastic resin having an excellent insulation property. The upper insulation case 210 has a desired height and an ellipse shape corresponding to that of the upright portion 224 of the ground plate 220, which is tightly fitted to the upright portion 224 of the ground plate 220.

The lower insulation case 212 is also made of the thermostatic resin or the thermoplastic resin having the excellent insulation property. The lower insulation case 212 has a desired height and an ellipse shape corresponding to that of the upright portion 224 of the ground plate 220, which is tightly fitted into a groove formed in a reverse surface of the upright portion 224 of the ground plate 220.

The extension pipes 222a and 222b are made from a conductive metal, in which annular flanges are respectively and integrally formed along each peripheral surface of the extension pipes 222a and 222b at positions adjacent to end portions of the extension pipes 222a and 222b.

The extension pipes 222a and 222b are respectively combined with the ground plate 220 in such a manner that after the end portions having the flange respectively pass through the through-holes 226a and 226b formed in the upright portion 224 of the ground plate 220 and the other end portion extends into the upper insulation case 210, wall portions of the extension pipes 226a and 226b are radially and outwardly bent around longitudinal axes of the extension pipes 222a and 222b in order that the flange portions and wall portions of the extension pipes 222a and 222b come in close contact with the upper and lower surfaces of the ground plate 220.

The electrode insulating pipes 230a and 230b are also made of the thermostatic resin or the thermoplastic resin having the excellent insulation property. As shown in FIG. 6, the electrode insulating pipes 230a and 230b respectively extend through the extension pipes 222a and 222b combined with the ground plate 220, of which one end portion is positioned in the upper insulation case 210 and the other end portion passes through the lower insulation case 212 to extend at a desired distance from a lower end portion of the lower insulation case 212.

The electrodes 240a and 240b are conductive rods having a predetermined diameter, to one end portion of which tabs 242a and 242b are respectively attached to apply high voltage. The electrodes 240a and 240b extend through the electrode insulating pipes 230a and 230b passing through the extension pipes 222a and 222b of the ground plate 220.

A space defined by the upper insulation case 210 and an upper surface of the ground plate 220 and a space defined by the lower insulation case 212 and a lower surface of the ground plate 220 are respectively filled with insulation resins 250 and 252.

In the capacitor 200 for the magnetron of the microwave oven according to the second embodiment of the present invention constructed as described above, firstly, the extension pipes 222a and 222b are fixed to the through-holes 226a and 226b of the ground plate 220 in the above-described manner.

Next, the upper insulation case 210 is tightly fitted to the upright portion 224 of the ground plate 220. Continuously, the lower insulation case 212 is tightly inserted into the groove defined by the upright portion 224 of the ground plate 220.

The electrode insulating pipes 230a and 230b pass through the lower insulation case 212 and the extension pipes 222a and 222b combined with the ground plate 220 to extend into the upper insulation case 210.

Then, the electrodes 240a and 240b are respectively extended into the electrode insulating pipes 230a and 230b. At this time, the electrodes 240a and 240b are inserted such that connection points of the one end thereof and the tabs 242a and 242b are in the same plane as the one end portion of the electrode insulating pipes 230a and 230b.

After the electrodes 240a and 240b are respectively inserted in the electrode insulating pipes 230a and 230b, the space defined by the upper insulation case 210 and the upper surface of the ground plate 220 is filled with the insulation resin 250. At this time, the insulation resin 250 is filled into the space to enclose the extension pipes 222a and 222b of the ground plate 220, the electrode insulating pipes 230a and 230b extending into the upper insulation case 210, and a part of the tabs 242a and 242b of the electrodes 240a and 240b. Furthermore, the space defined by the lower insulation case 212 and the lower surface of the ground plate 220 is filled with the insulation resin 252. The insulation resin 252 is filled into the space to enclose a part of the electrode insulating pipes 230a and 230b extending through the lower insulation case 212.

The insulation resins 250 and 252 filled in the upper insulation case 210 and the lower insulation case 212, as described above, are cured for a sufficient time. Epoxy resin is mainly used as the above-described insulation resin.

The capacitor 200 constructed as described above is attached through the ground plate 220 to a shield case (not shown), while the tabs 242a and 242b respectively attached to one end of the electrodes 240a and 240b extend out of the shield case.

The tabs 242a and 242b of the electrodes 240a and 240b are connected to an outer electric source while the other end portions of the electrodes 240a and 240b are connected to a chock coil, so that the electric current is applied to the magnetron through electrodes 240a and 240b, the chock coil, the cathode and the anode.

Hereinafter, an operation and an effect of the capacitor 200 for the magnetron of the microwave oven according to the second embodiment of the present invention will be described with reference to the accompanying drawings.

When the microwave oven is operated in the state that food to be cooked is placed in a cooking chamber of the microwave oven, the magnetron (not shown) emits the microwave. At this time, the magnetron emits not only the microwave needed to cook the food but also the unnecessary microwave noise. Such microwave noise flows back to a filament and the cathode to supply the electric current.

The microwave noise flowing back to the capacitor 200 from the magnetron is partially set off by induction resistance of the chock coil (not shown) connected to the filament (not shown) of the magnetron. The rest of the microwave noise passes through the electrodes 240a and 240b connected to the chock coil, while being shielded by means of the extension pipes 222a and 222b of the ground plate 220 enclosing the electrodes 240a and 240b.

As described above, the capacitor according to the second embodiment of the present invention has a simple structure as compared to the conventional capacitor. The extension pipes of the ground plate can prevent the leakage of the microwave noise.

Hereinafter, a capacitor 300 of a magnetron for a microwave oven according to the third embodiment of the present invention will be described in detail with reference to the accompanying drawings.

Figure 7:
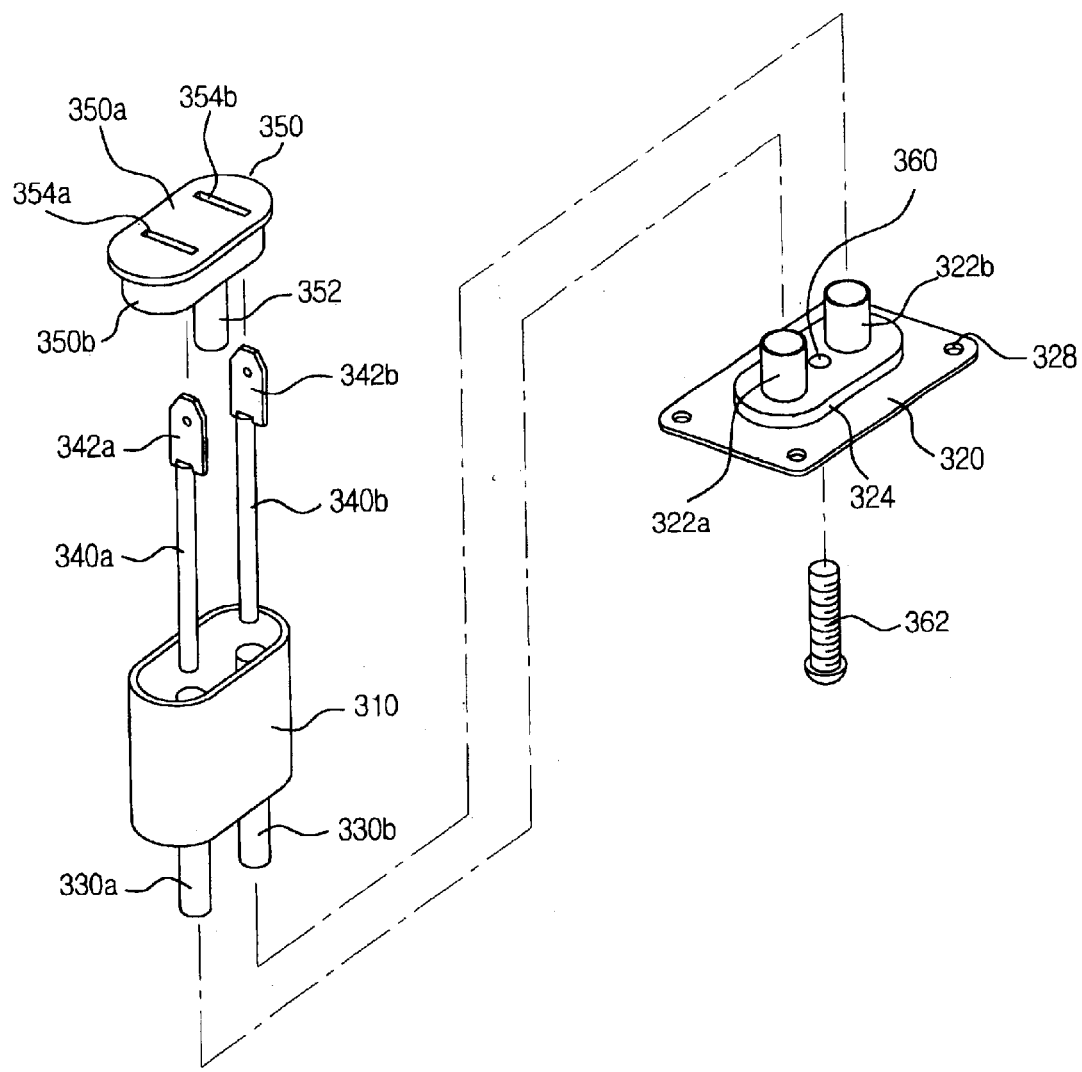
FIG. 7 is an exploded perspective view of a capacitor according to a third embodiment of the present invention.
Figure 8:
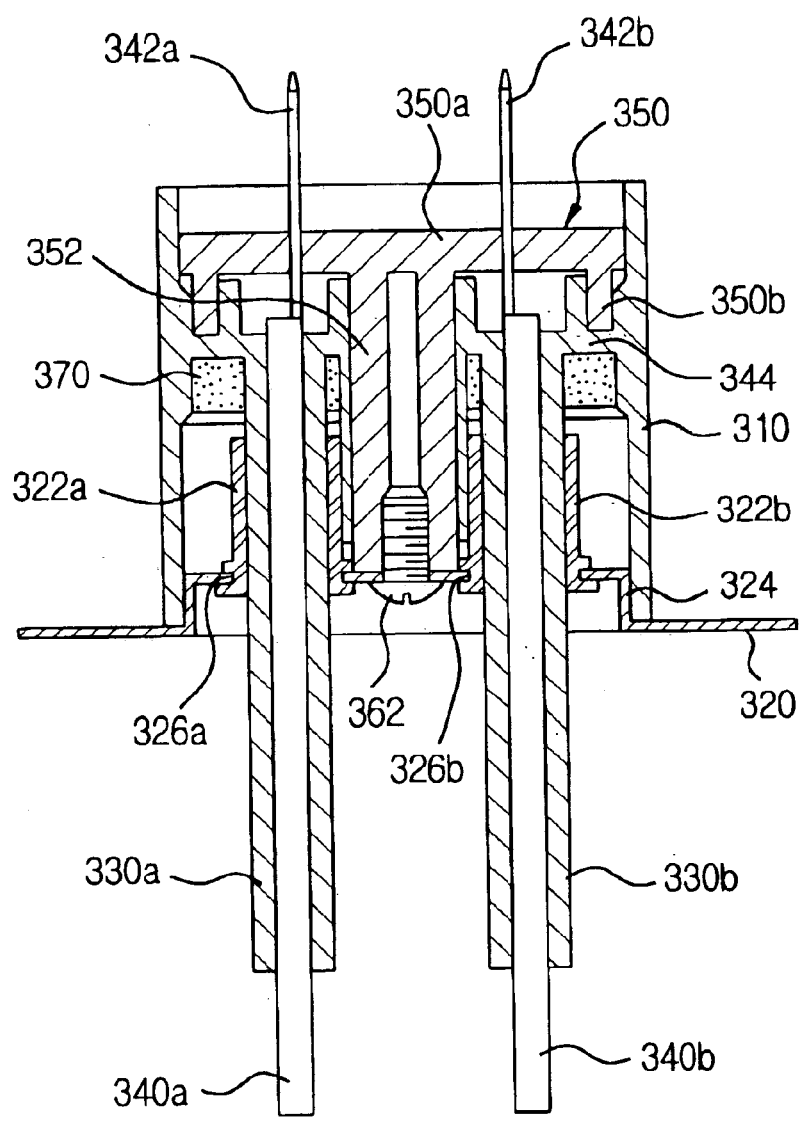
FIG. 8 is a sectional view of the capacitor shown in FIG. 7.

FIG. 7 is an exploded perspective view of the capacitor 300 for the magnetron of the microwave oven according to the third embodiment of the present invention, and FIG. 8 is a sectional view of the capacitor 300 shown in FIG. 7.

As shown in FIGS. 7 and 8, the capacitor 300 for the magnetron of the microwave oven according to the third embodiment of the present invention includes an insulation case 310 integrally formed with a pair of electrode insulating pipes 330a and 330b, a ground plate 320 for shielding microwave noise generated from the magnetron, which has a pair of extension pipes 322a and 322b and which is combined with the insulation case 310 in order that the electrode insulating pipes 330a and 330b extend through the extension pipes 322a and 322b from a lower portion of the insulation case 310, a pair of electrodes 340a and 340b for supplying electric current to the magnetron, which extend through the electrode insulating pipes 330a and 330b of the insulation case 310, and a cover 350 for fixing the electrodes 340a and 340b, which is inserted into the insulation case 310 through an upper opening of the insulation case 310.

Referring to FIGS. 7 and 8, the ground plate 320 is made of conductive metal, of which a surface is projected at a desired height by a press. The ground plate 320 generally has a rectangular shape, of which an upright portion 324 has an ellipse shape. Through-holes 326a and 326b are formed at a predetermined distance from each other in the upright portion 324 of the ground plate 320 in order to fix the pair of extension pipes 322a and 322b, through which the pair of electrode insulating pipes 330a and 330b respectively extends, to the through-holes 326a and 326b.

Four thru-holes 328 are respectively formed at four corners of the ground plate 320, and the capacitor 300 can be fixed through the four thru-holes 328 to a shield case (not shown). Furthermore, a screwed hole 360 is formed between the through-holes 326a and 326b formed in the upright portion 324 of the ground plate 320 in order to insert a screw 362 when combining the cover 350 to the insulation case 310 by means of the screw 362.

The extension pipes 322a and 322b are made of conductive metal, at positions adjacent to one end of which annular flanges are respectively and integrally formed along peripheral surfaces of the extension pipes 322a and 322b.

The extension pipes 322a and 322b are respectively combined with the ground plate 320 in such a manner that after the end portions of the extension pipes 322a and 322b respectively having the flange pass through the through-holes 326a and 326b formed in the upright portion 324 of the ground plate 320 and the other end portions of the extension pipes 322a and 322b extend into the upper insulation case 310, wall portions of the extension pipes 326a and 326b are radially and outwardly bent around longitudinal axes of the extension pipes 322a and 322b in order that the flange portions and wall portions of the extension pipes 322a and 322b come in close contact with the upper and lower surfaces of the ground plate 320.

The insulation case 310 is manufactured of thermostatic resin or thermoplastic resin having an excellent insulation property. The insulation case 310 has an ellipse shape corresponding to that of the upright portion 324 of the ground plate 320, which also has a desired height. The electrode insulating pipes 330a and 330b are integrally formed in the insulation case 310.

The electrode insulating pipes 330a and 330b have a constant diameter along a whole length thereof, of which the upper end portion is positioned in the insulation case 310 and the lower end portion extends out of the insulation case 310. The electrode insulating pipes 330a and 330b are integrated with the insulation case 310 by a fixing plate 344 at an intermediate position of the insulation case 310. A thru-hole is formed in the fixing plate 344 between the electrode insulating case 330a and 330b in order for a connecting rod 352 of the cover 350 to extend through the thru-hole. A screwed hole is formed in the connecting rod 352 of the cover 350 to screw a screw so that the connecting rod 352 of the cover 350 can be fixed to the ground plate 320 by means of the screw 362 when assembling the capacitor 300.

The electrodes 340a and 340b are conductive metallic rod having a desired diameter, of which each end respectively has tabs 342a and 342b respectively attached thereto. The electrodes 340a and 340b extend through the electrode insulating pipes 330a and 330b passing through the through-holes 326a and 326b of the ground plate 320.

The cover 350 includes an ellipse shaped body 350a, a supporting wall 350b extending downwardly from an edge of the body 350a, and a hollow connecting rod 352 extending downwardly from a center portion of the cover 350, of which a distal end comes in contact with the upright portion of the ground plate 320. A pair of slots 354a and 354b is side by side penetrated at a predetermined distance from each other, which is coaxial with the electrodes 340a and 340b, or which is eccentric from axes of the electrode insulating pipes and the electrodes. The tabs 342a and 342b of the electrodes 340a and 340b which extend through the electrode insulating pipes 330a and 330b of the insulation case 310 extend through the slots 354a and 354b.

Meanwhile, electric wave absorbing material 370 is further disposed in the lower space of the insulation case 310 to absorb and shield the microwave noise which is leaked from the magnetron, resulting in improving the effect of shielding the microwave noise. The electric wave absorbing material 370 also has an ellipse shape, which includes a pair of through-holes through which the electrode insulating pipes 330a and 330b are extended and a thru-hole through which the connecting rod 352 of the cover 350 passes. A mixture of ferromagnetic powder, organic insulation material, rubber or insulation resin is used as the electric wave absorbing material 370.

In the capacitor 300 having the structure as described above, the electric wave absorbing material 370 is inserted into the lower space of the insulation case. At this time, the electric wave absorbing material 370 encloses the electrode insulating pipes 330a and 330b.

When the electrode insulating pipes 330a and 330b of the insulation case 310 respectively extend through the through-holes 326a and 326b formed in the upright portion 324 of the ground plate 320, then, the lower end portion of the insulation case 310 is secured to the upright portion of the ground plate 320.

After the electrodes 340a and 340b respectively extend through the electrode insulating pipes 330a and 330b of the insulation case 310, the cover 350 is inserted in the insulation case 310 through the upper opening of the insulation case 310. At this time, the connecting rod 352 of the cover 350 passes through the fixing plate 344 connecting the electrode insulating pipes 330a and 330b to the insulation case 310, which in turn comes in contact with the upright portion 324 of the ground plate 320 to correspond to the screwed hole formed in the upright portion 324. When the cover 350 is combined with the insulation case 310, furthermore, the tabs 342a and 342b of the electrodes 340a and 340b pass through the slots 354a and 354b formed in the body 350a of the cover 350 to extend out of the insulation case 310 as shown in FIG. 8.

The capacitor 300 assembled as described above is attached to a shield case (not shown) through the ground plate 320 while the tabs 342a and 342b respectively attached to each end of the electrodes 340a and 340b extend out of the shield case.

The tabs 340a and 340b of the electrodes 340a and 340b are connected to an outer electric source while the other ends of the electrodes 310a and 340b are connected to a chock coil, so that electricity is supplied to the magnetron through the electrodes 340a and 340b, the chock coil, the cathode and the anode.

Hereinafter, an operation and an effect of the capacitor 300 of the magnetron for the microwave oven according to the third embodiment of the present invention will be described with reference to the accompanying drawings.

When the microwave oven is operated in the state that food to be cooked is placed in a cooking chamber of the microwave oven, the magnetron (not shown) emits the microwave. At this time, the magnetron emits not only the microwave required to cook the food but also unnecessary microwave noise. Such microwave noise flows back to a filament and the cathode to supply the electric current.

The microwave noise flowing back to the capacitor 300 from the magnetron is partially set off by induction resistance of the cock coil (not shown) connected to the filament (not shown) of the magnetron. The rest of the microwave noise passes through the electrodes 340a and 340b connected to the cock coil which in turn is shielded by means of the extension pipes 322a and 322b of the ground plate 320 enclosing the electrodes 340a and 340b.

As described above, the capacitor according to the third embodiment of the present invention has a simple structure as compared to the conventional capacitor. The extension pipes of the ground plate can prevent the leakage of the microwave noise. Furthermore, it is possible to improve the effect of absorbing and shielding the leaked microwave noise by means of the electric wave absorbing material disposed in the lower space of the insulation case.

Hereinafter, a capacitor 400 of a magnetron for a microwave oven according to a fourth embodiment of the present invention will be described in detail with reference to the accompanying drawings.

Figure 9:
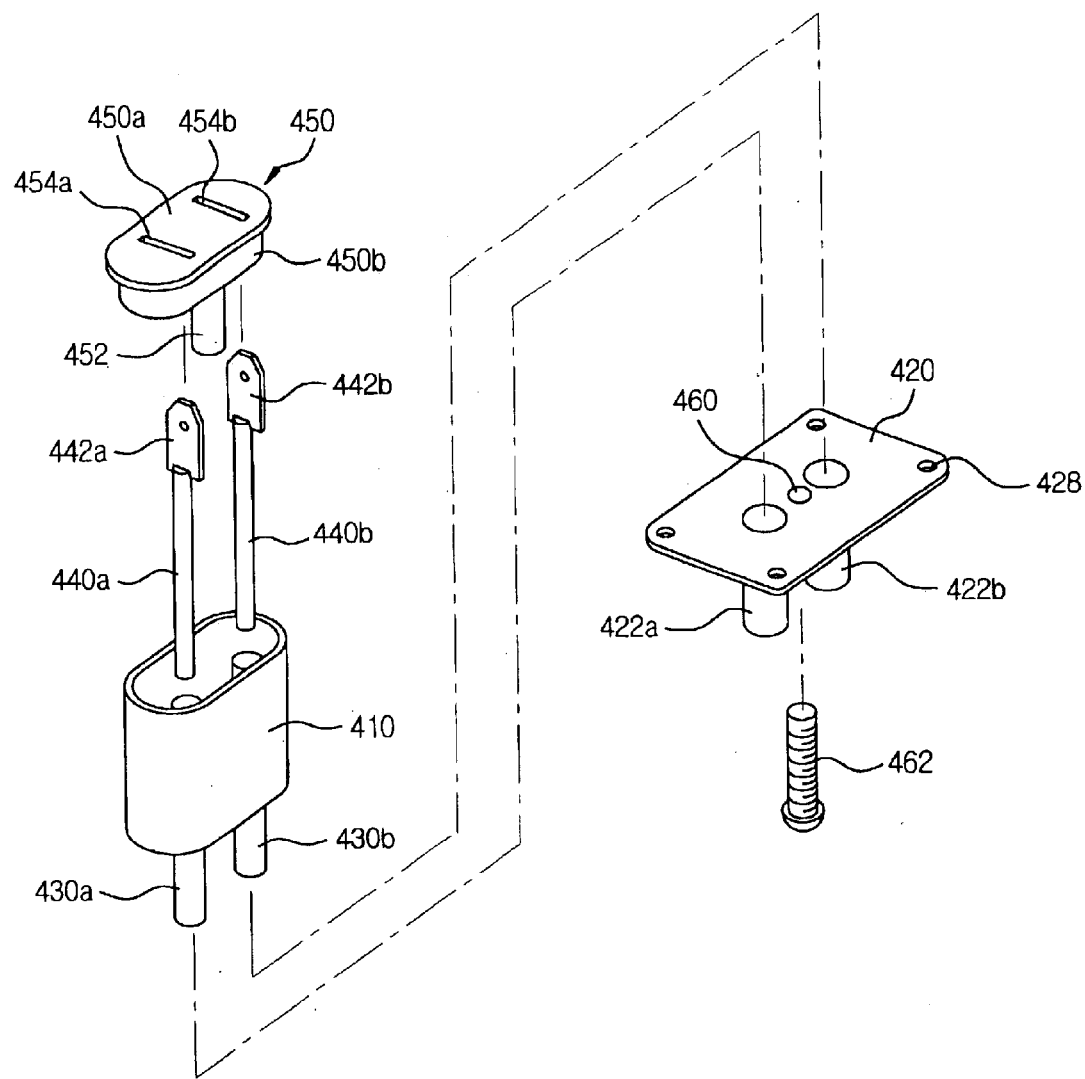
FIG. 9 is an exploded perspective view of a capacitor according to a fourth embodiment of the present invention.
Figure 10:
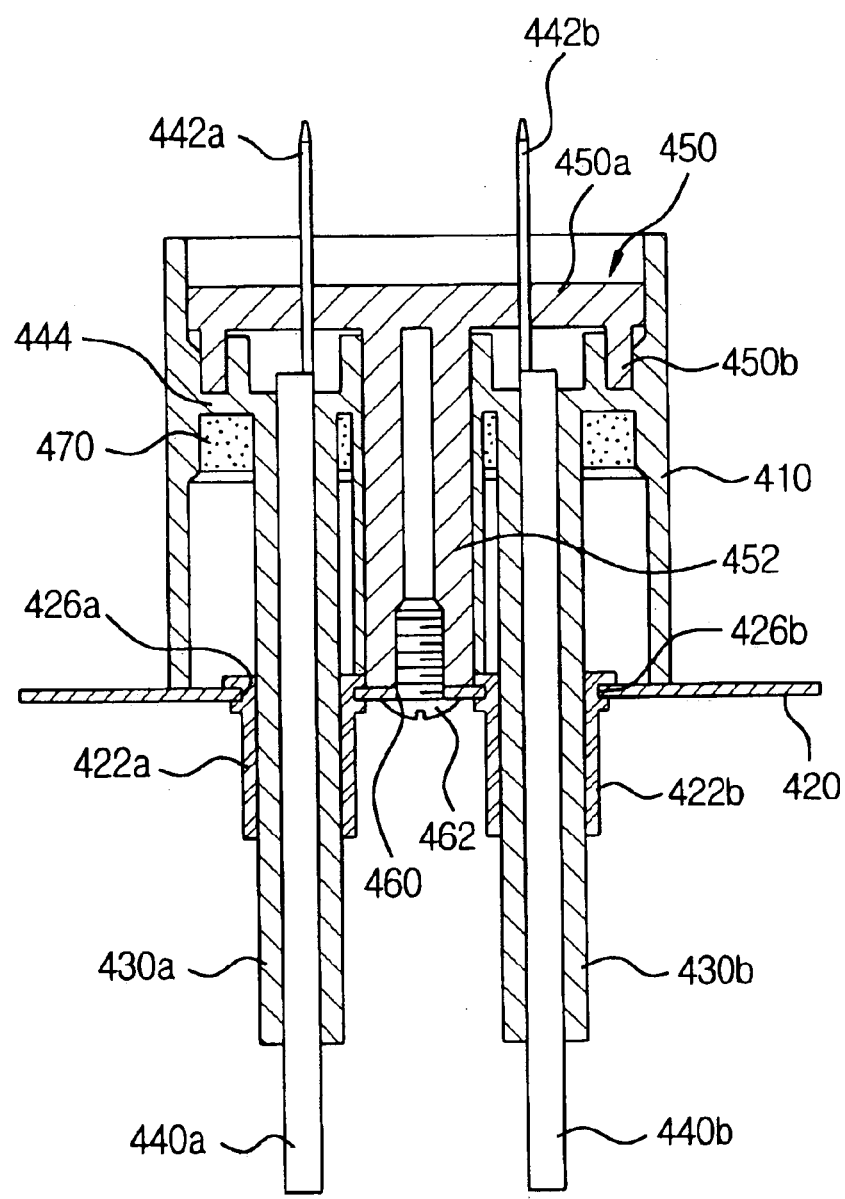
FIG. 10 is a sectional view of the capacitor shown in FIG. 9.

FIG. 9 is an exploded perspective view of a capacitor 400 of a magnetron for a microwave oven according to the fourth embodiment of the present invention, and FIG. 10 is a sectional view of the capacitor 400 shown in FIG. 9.

As shown in FIGS. 9 and 10, the capacitor 400 of the magnetron for the microwave oven according to the fourth embodiment of the present invention includes an insulation case 410 integrally formed with a pair of electrode insulating pipes 430a and 430b, a ground plate 420 for shielding microwave noise generated from the magnetron, which comprises a pair of extension pipes 422a and 422b and is combined with the insulation case 410 in order that the electrode insulating pipes 430a and 430b extend through the extension pipes 422a and 422b, a pair of electrodes 440a and 440b for supplying electric current to the magnetron, which extend through the electrode insulating pipes 430a and 430b of the insulation case 410, and a cover 450 for fixing the electrodes 440a and 440b to the insulation case 410, which is inserted into the insulation case 410 through an upper opening of the insulation case 410.

Referring to FIGS. 9 and 10, the ground plate 420 is a flat plate made of conductive metallic material, which typically has a rectangular shape. Through-holes 426a and 426b are formed at a desired distance from each other in the ground plate 420 in order to couple a pair of extension pipes 422a and 422b which extend through the pair of electrode insulating pipes 430a and 430b, to the ground plate 420.

Four through-holes 428 are respectively formed at four corners of the ground plate 420, through which the capacitor 400 is fixed to the shield case (not shown). Furthermore, a screwed hole 460 is formed between the through-holes 426a and 426b in the ground plate 420 to insert a screw when the cover 450 is fixed to the insulation case 410 by means of the screw.

The extension pipes 422a and 422b are made from conductive metal, which respectively have an annular flange integrally formed therewith along a peripheral surface at a position adjacent to one end of the extension pipes 422a and 422b.

The extension pipes 422a and 422b are respectively combined with the ground plate 420 in such a manner that after the end portions of the extension pipes 422a and 422b respectively having the flange pass through the through-holes 426a and 426b formed in the ground plate 420 and the other end portions of the extension pipes 422a and 422b extend into the insulation case 410, wall portions of the extension pipes 426a and 426b are radially and outwardly bent around longitudinal axes of the extension pipes 422a and 422b in order that the flange portions and wall portions of the extension pipes 422a and 422b come in close contact with the upper and lower surfaces of the ground plate 420.

The insulation case 410 is made of thermostatic resin or thermoplastic resin having an excellent insulation property, in which the pair of electrode insulating pipes 430a and 430b is integrally formed.

Upper end portions of the electrode insulating pipes 430a and 430b are positioned in the insulation case 410, while a lower end portions of the electrode insulating pipes 430a and 430b extend out of the insulation case 410. The electrode insulating pipes 430a and 430b are supported by the fixing plate 444 at an intermediate position in the insulation case 410 to be integrated with the insulation case 410. A through-hole, through which the connecting rod 452 of the cover 450 extends, is formed between the electrode insulating pipes 430a and 430b in the fixing plate 444. As a screwed hole is formed in the connecting rod 452 of the cover 450 to screw a screw, the cover 450 can be fixed by the screw to the ground plate 420 when assembling.

The pair of electrodes 440a and 440b is a conductive metallic rod having a desired diameter, to which each end the tabs 442a and 442b are respectively attached to apply high voltage to the magnetron. The electrodes 440a and 440b extend through the electrode insulating pipes 430a and 430b passing through the through-holes 426a and 426b of the ground plate 420.

The cover 450 includes an ellipse shaped body 450a, a supporting wall 450b extending downwardly from an edge of the body to come in contact with a surface of the ground plate 420, a hollow connecting rod 452 extending downwardly from a center portion of the body, of which a distal end comes in contact with the ground plate 420. A pair of slots 454a and 454b is side by side penetrated at a predetermined distance from each other in the body 452 of the cover 450, which is coaxial with the electrode insulating pipes 430a and 430b and the electrode 440a and 440b, or which is eccentric from axes of the electrode insulating pipes 430a and 430b and the electrodes 440a and 440b. The tabs 442a and 442b of the electrodes 440a and 440b, which extend through the electrode insulating pipes 430a and 430b of the insulation case 410, respectively pass through the slots 454a and 454b.

Meanwhile, electric wave absorbing material 470 is further disposed in a lower space of the insulation case 410 to absorb and shield leaked microwave noise, thereby improving an effect of shielding the microwave noise. The electric wave absorbing material 470 also has an ellipse shape, which has a pair of through-holes through which the electrode insulating pipes 430a and 430b pass and a thru-hole through which the connecting rod 452 of the cover 450 extends. A mixture of ferromagnetic powder, organic insulation material, rubber or insulation resin is used as the electric wave absorbing material 470 by molding them.

In the capacitor 400 having the above-described structure, the electric wave absorbing material 470 is inserted in the lower space of the insulation case 410. At this time, the electric wave absorbing material 470 encloses the electrode insulating pipes 430a and 430b.

Then, the electrode insulating pipes 430a and 430b of the insulation case 410 extend through the through-holes 426a and 426b formed in the ground plate 420, while the lower end portion of the insulation case 410 comes in contact with the ground plate 420.

After the electrodes 440a and 440b are extended through the electrode insulating pipes 430a and 430b of the insulation case 410, the cover 450 is inserted into the insulation case 410 through the upper opening of the insulation case 410. At this time, the connecting rod 452 of the cover 450 passes through the fixing plate 444 connecting the electrode insulating pipes 430a and 430b to the insulation case 410, which in turn comes in contact with the ground plate 420 to correspond to the screwed hole 460 formed in the ground plate 420. When the cover 450 is combined with the insulation case 410, furthermore, the tabs 442a and 442b of the electrodes 440a and 440b pass through the slots 454a and 454b formed in the body 450a of the cover 450 to extend out of the insulation case 410, as shown in FIG. 10.

The capacitor 400 assembled as described above is attached to the shield case (not shown) through the ground plate 420, while the tabs 442a and 442b respectively attached to each end of the electrodes 440a and 440b extend out of the shield case.

The tabs 442a and 442b of the electrodes 440a and 440b are connected to the outer electric source, and the other ends of the electrodes 440a and 440b are connected to the chock coil, so that the electric current is supplied to the magnetron through the electrode 440a and 440b, the chock coil, the cathode, and the anode.

Hereinafter, an operation and an effect of the capacitor 400 of the magnetron for the microwave oven according to the fourth embodiment of the present invention will be described with reference to the accompanying drawings.

When the microwave oven is operated in the state that food to be cooked is placed in a cooking chamber of the microwave oven, the magnetron (not shown) emits the microwave. At this time, the magnetron emits not only the microwave required to cook the food but also unnecessary microwave noise. Such microwave noise flows back to a filament and the cathode to supply the electric current.

The microwave noise flowing back to the capacitor 400 from the magnetron is partially set off by induction resistance of the cock coil (not shown) connected to the filament (not shown) of the magnetron. The rest of the microwave noise passes through the electrodes 440a and 440b connected to the cock coil which in turn is shielded by means of the extension pipes 422a and 422b of the ground plate 420 enclosing the electrodes 440a and 440b.

As described above, the capacitor according to the fourth embodiment of the present invention has a simple structure as compared to the conventional capacitor. The extension pipes of the ground plate can prevent the leakage of the microwave noise. Furthermore, it is possible to improve the effect of absorbing and shielding the leaked microwave noise by means of the electric wave absorbing material disposed in the lower space of the insulation case.

Figure 11:
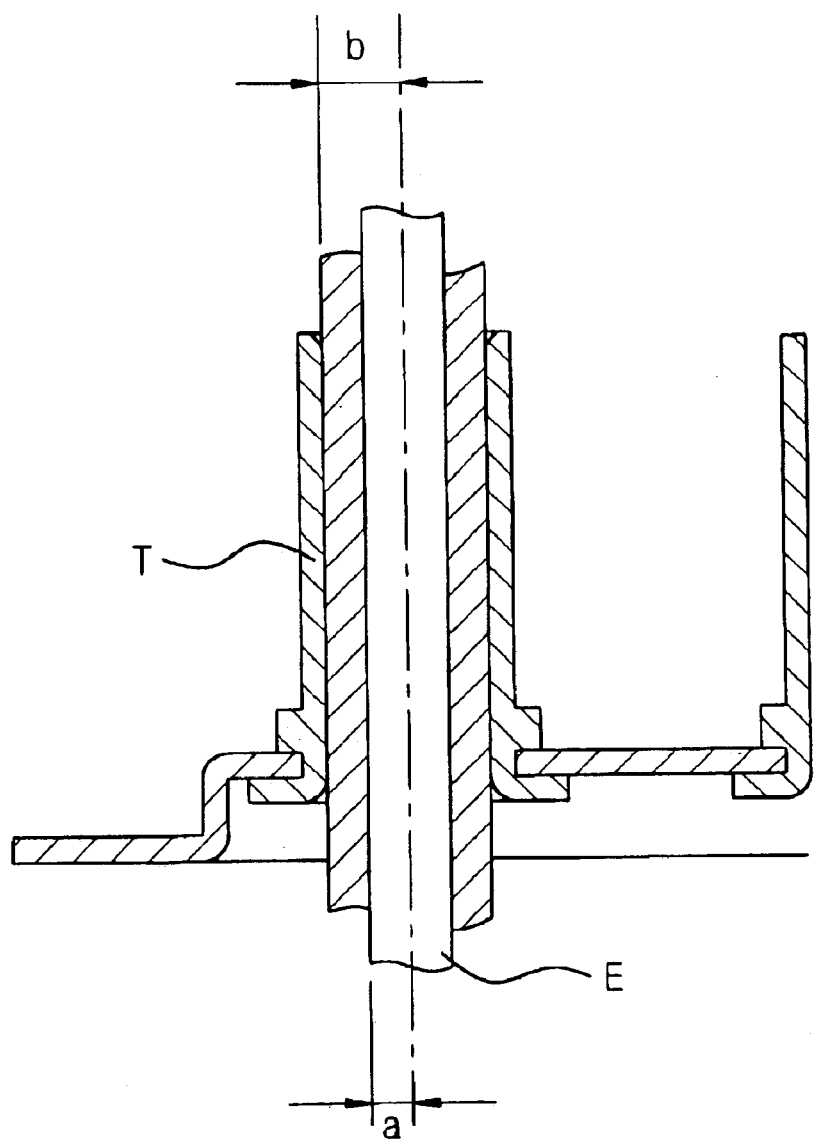
FIG. 11 illustrates a relationship between electrodes of the capacitor and extension pipes of a ground plate according to the second, third and fourth embodiments of the present invention.

FIG. 11 is a view illustrating a relationship between the extension pipes and the electrodes adapted to the capacitor according to the second, third and fourth embodiments of the present invention.

Referring to FIG. 11, radius of the electrode E is denoted by a reference letter a, and radius of the extension pipe T is indicated by a reference letter b. According to the second, third and fourth embodiments of the present invention, the extension pipes 222a, 322a and 422a of the ground plates 220, 320 and 420 are respectively coaxial with the electrodes 220a, 320a and 420a. Frequency of the microwave, which the extension pipes 222a, 322a and 422a can shield, can be obtained by the following equation:

$$fc=c/p(a+b)$$

wherein, c is the velocity of the electric wave, a is the radius of the electrode and b is the radius of the extension pipe.

The radiuses of the extension pipes 222a, 322a and 422a, and the electrodes 220a, 320a and 420a, which are respectively coaxial with each other, can be obtained by using the above equation. That is, sum (a+b) of radiuses of the extension pipes and the electrodes which is capable of shielding noise of 8f (f=2450 MHz) causing an electric wave interruption to the adjacent electric appliances, can be obtained by the above equation.

The sum of the radiuses of the extension pipes 222a, 322a and 422a, and the electrodes 220a, 320a and 420a can be obtained by a following equation:

$$(a+b)=(3'1011)/(p'8'2450'106)=5 \text{ mm}$$

Thus, it is preferable to make the extension pipes and the electrodes so that the sum of the radiuses of the extension pipe and the electrode is less than 5 mm.

Figure 12:
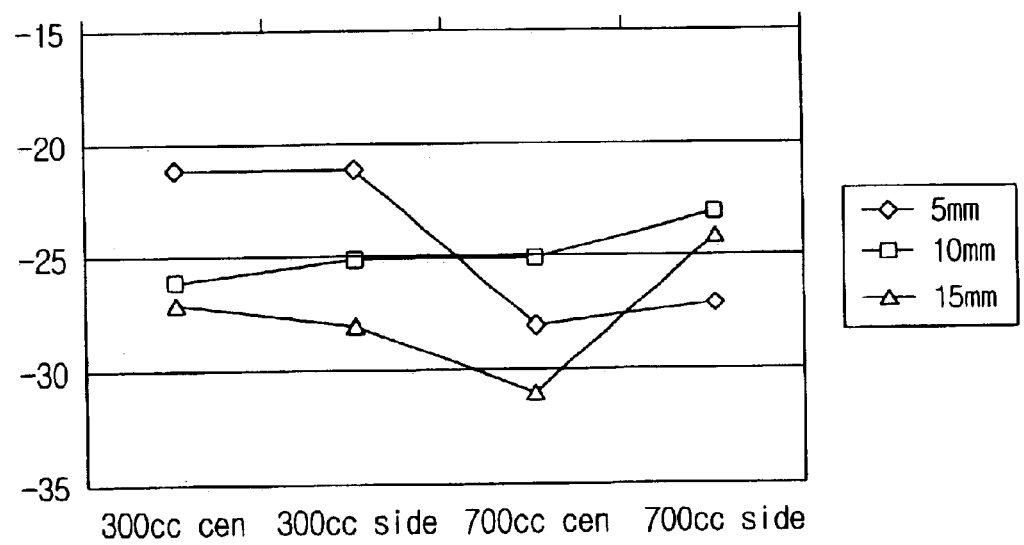
FIG. 12 is a graph showing an effect of shielding against leakage of microwave according to a relation of amount of water to be heated and lengths of the extension pipes adopted to the capacitor according to the second, third and fourth embodiments of the present invention.

FIG. 12 is a graph showing an effect of shielding a leakage of the microwave according to a relation of the amount of heated water and a length of the extension pipe adapted to the capacitor according to the second, third and fourth embodiments of the present invention.

Typically, the unnecessary microwave noise generated from the magnetron has a frequency in a range of 2f to 3f (f=2450 MHz). The length of the extension pipes 222a, 322a and 422a is inversely proportional to the wave length of the unnecessary microwave noise, which is preferably about 15 mm when the frequency of the noise is 2f while being preferably about 10 mm when the frequency of the noise is 3f.

Referring to FIG. 12, when water of 300 cc and water of 700 cc are positioned at a center portion and an edge portion of the cooking chamber of the microwave oven to be heated, it is understood that the extension pipe having the length of 15 mm has superior effect of preventing the leakage of the microwave noise generated from the magnetron compared to the extension pipes having different lengths.

Figure 13:
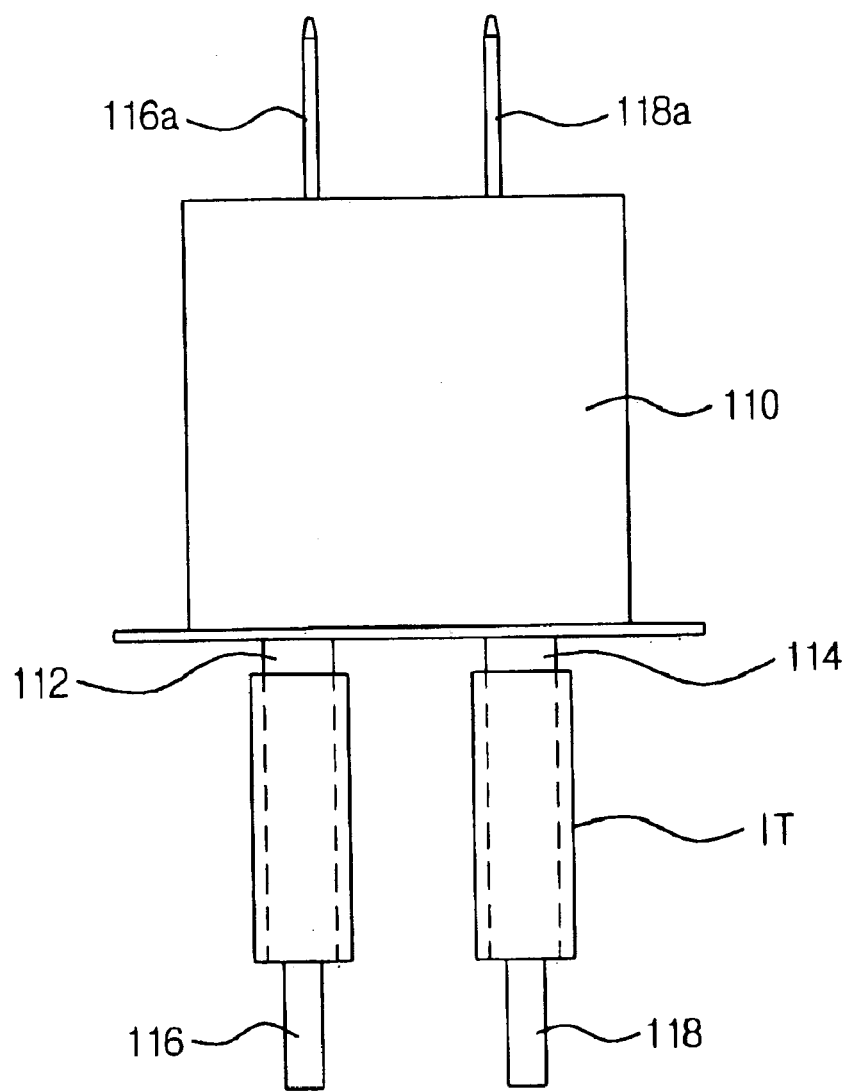
FIG. 13 is a front view of the capacitor according to the third embodiment of the present invention, in which insulating tubes respectively enclose peripheral surfaces of electrode insulating pipes of the capacitor.

FIG. 13 is a view of the capacitor 100 of the magnetron for the microwave oven according to the first embodiment of the present invention, in which an insulating tube IT is coated on the lower end portion of the electrode insulating pipes 112 and 114 of the capacitor 100.

High voltage of about 10 kV is applied to the electrodes 116 and 118 mounted in the capacitor 100, thereby arc is generated along the peripheral surfaces of the electrode insulating pipes 112 and 114. The insulating tube IT restrains the arc generated on the peripheral surfaces of the electrode insulating pipes 112 and 114 so as to prevent the arc from being generated between the electrodes 116 and 118, and the ground plate 120.

While it is illustrated that the insulating tube IT is coated on the electrode insulating pipes 112 and 114 of the capacitor 100 of the magnetron for the microwave oven according to the first embodiment of the present invention, it is understood by those skilled in the art that the insulating tube IT can be applied to the second, third and fourth embodiments as well as the first embodiment of the present invention.

In the capacitors according to the embodiments of the present invention constructed as described above, the ground plate having the extension pipes combined therewith shields the microwave noise generated from the magnetron, or the electric wave absorbing material absorbs the microwave noise so that it is possible to reduce the electric obstruction, which is caused by the noise, in the home appliances near the microwave oven.

In addition, there is an advantage in that the capacitor according to the present invention has a simple structure, which results in reducing the manufacturing cost, due to the part such as a ceramic dielectric applied to the capacitor according to the conventional art. Furthermore, there is the other advantage in that as the structure of the capacitor of the present invention is simplified, an assembling rate can be remarkably improved so as to increase the productivity.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A capacitor for a magnetron of a microwave oven comprising:
   an insulation case including an upper insulation case and a lower insulation case;
   a ground plate which is combined with the insulation case, for absorbing and shielding noises such as unnecessary microwave generated from the magnetron; and
   a pair of electrodes which has a tab and which extends through the insulation case and the ground plate, for supplying electric current to the magnetron.

2. A capacitor for a magnetron of a microwave oven as claimed in claim 1, wherein the ground plate having an upright portion upwardly arising at a desired height and a pair of thru-holes formed at a predetermined distance from each other in the upright portion.

3. A capacitor for a magnetron of a microwave oven as claimed in claim 2, wherein the upper insulation case is inserted on the upright portion of the ground plate and the lower insulation case is inserted at a lower surface of the ground plate into a groove defined by the upright portion to be combined with the ground plate.

4. A capacitor for a magnetron of a microwave oven as claimed in claim 3, wherein a pair of extension pipes having a desired length is mounted at a predetermined distance from each other in the ground plate, while extending into the upper insulation case.

5. A capacitor for a magnetron of a microwave oven as claimed in claim 4, wherein a pair of electrode insulating pipes respectively extend through the pair of extension pipes, the upper insulation case and the lower insulation case, in which a pair of electrodes respectively extends through the pair of electrode insulating pipes.

6. A capacitor for a magnetron of a microwave oven as claimed in claim 5, wherein a space defined by the upper insulation case and the ground plate and a space defined by the lower insulation case and the ground plate are filled with insulating resin.

7. A capacitor for a magnetron of a microwave oven comprising:

an insulation case having a pair of electrode insulating pipes respectively and integrally formed thereon at a predetermined distance from each other and diameters of which become small at a position near a lower end portion of the insulation case;

a ground plate which is combined with the insulation case, for absorbing and shielding noises such as unnecessary microwave generated from the magnetron, the ground plate having an upright portion upwardly arising at a desired height and a pair of thru-holes formed at a predetermined distance from each other in the upright portion; and a pair of electrodes which has a tab and which extends through the insulation case and the around plate, for supplying electric current to the magnetron.

8. A capacitor for a magnetron of a microwave oven comprising:

an insulation case having a pair of electrode insulating pipes respectively and integrally formed thereon at a predetermined distance from each other, and diameter of which are identical along their whole lengths;

a ground plate which is combined with the insulation case, for absorbing and shielding noises such as unnecessary microwave generated from the magnetron, the round plate having an upright portion upwardly arising at a desired height and a pair of thru-holes formed at a predetermined distance from each other in the upright portion; and a pair of electrodes which has a tab and which extends through the insulation case and the ground plate, for supplying electric current to the magnetron.

9. A capacitor for a magnetron of a microwave oven as claimed in claim 7 or 8, wherein the insulation case is combined with the ground plate in order that the pair of electrode insulating pipes of the insulation case extends through the ground plate, in which the pair of electrodes respectively extends through the electrode insulating pipe.

10. A capacitor for a magnetron of a microwave oven as claimed in claim 9, further comprising a cover for fixing the pair of electrodes, wherein the fixing cover is disposed over upper ends of the electrode insulating pipes of the insulation case in order that tabs of the pair of electrodes extend through the fixing cover.

11. A capacitor for a magnetron of a microwave oven as claimed in claim 8, wherein the upwardly rising ellipse upright portion is formed at a surface of the ground plate, in which through-holes through which the pair of electrode insulating pipes of the insulation case respectively extend and an aperture, through which a fixing pipe extending from the fixing cover extends, are formed.

12. A capacitor for a magnetron of a microwave oven as claimed in claim 11, wherein a pair of extending pipes having a desired length is mounted at a predetermined distance from each other in the ground plate so as to extend through the insulation case.

13. A capacitor for a magnetron of a microwave oven comprising:

an insulation case:

a ground plate which is combined with the insulation case, for absorbing and shielding noises such as unnecessary microwave generated from the magnetron, the ground plate being a flat plate in which a pair of extending pipes having a desired length is mounted at a desired distance from each other in the ground plate so as to extend downwardly from the ground plate; and a pair of electrodes which has a tab and which extends through the insulation case and the ground plate, for supplying electric current to the magnetron.

14. A capacitor for a magnetron of a microwave oven as claimed in claim 12 or 13, wherein the pair of electrode insulating pipes extends through the extending pipes of the ground plate and the insulation case, through which a pair of electrodes respectively extends.

15. A capacitor for a magnetron of a microwave oven as claimed in claim 14, wherein electric wave absorbing material for preventing a leakage of microwave noise is disposed in a space defined by the insulation case and the ground plate.

16. A capacitor for a magnetron of a microwave oven as claimed in claim 15, wherein the electric wave absorbing material is a mixture of ferromagnetic powder and organic insulation material.

17. A capacitor for a magnetron of a microwave oven as claimed in one of claim 5, 12 and 13, wherein a sum of radiuses of the electrode and the extending pipe is less than 5 mm.

18. A capacitor for a magnetron of a microwave oven as claimed in claim 3 or 7, wherein insulating tubes are coated at respective lower ends of the electrode insulating pipes to prevent electric arc from being generated on peripheral surfaces of the electrode insulating pipes.

19. A capacitor for a magnetron of a microwave oven as claimed in claim 9, wherein insulating tubes are coated at respective lower ends of the electrode insulating pipes to prevent electric arc from being generated on peripheral surfaces of the electrode insulating pipes.

20. A capacitor for a magnetron of a microwave oven as claimed in 14, claim wherein insulating tubes are coated at respective lower ends of the electrode insulating pipes to prevent electric arc from being generated on peripheral surfaces of the electrode insulating pipes.

21. A capacitor for a magnetron of a microwave oven as claimed in claim 10, wherein the upwardly rising ellipse upright portion is formed at a surface of the ground plate, in which through-holes through which the pair of electrode insulating pipes of the insulation case respectively extend and an aperture, through which a fixing pipe extending from the fixing cover extends, are formed.

* * * * *